US009689891B2

(12) United States Patent
Moon (10) Patent No.: US 9,689,891 B2
(45) Date of Patent: Jun. 27, 2017

(54) AUTOMATIC GAIN TUNING IN ATOMIC FORCE MICROSCOPY

(75) Inventor: Christopher Ryan Moon, Cupertino, CA (US)

(73) Assignee: Keysight Technologies, Inc., Santa Rosa, CA (US)

(*) Notice: Subject to any disclaimer, the term of this patent is extended or adjusted under 35 U.S.C. 154(b) by 925 days.

(21) Appl. No.: 13/117,238

(22) Filed: May 27, 2011

(65) Prior Publication Data
US 2012/0304343 A1 Nov. 29, 2012

(51) Int. Cl.
| G01Q 60/24 | (2010.01) |
| G01Q 10/06 | (2010.01) |
| B82Y 35/00 | (2011.01) |
| G01Q 60/36 | (2010.01) |

(52) U.S. Cl.
CPC ............ *G01Q 10/065* (2013.01); *B82Y 35/00* (2013.01); *G01Q 60/363* (2013.01)

(58) Field of Classification Search
CPC ........ G01Q 10/00; G01Q 10/02; G01Q 10/04; G01Q 10/045; G01Q 10/06; G01Q 10/065; G01Q 20/00; G01Q 20/04; G01Q 40/00; G01Q 40/02; G01Q 60/00; G01Q 60/24; G01Q 60/32; G01Q 60/34; G01Q 60/36; G01Q 60/363
USPC ........ 850/33, 38, 39, 42, 1, 2, 3, 4, 5, 7, 11, 850/19, 20, 61
See application file for complete search history.

(56) References Cited

U.S. PATENT DOCUMENTS

| 4,889,988 | A | * | 12/1989 | Elings et al. ................. 850/4 |
| 5,376,790 | A | * | 12/1994 | Linker et al. ................. 850/2 |
| 5,436,448 | A | * | 7/1995 | Hosaka et al. ................ 850/1 |
| 5,466,935 | A | * | 11/1995 | Ray et al. .................... 850/4 |
| 5,631,410 | A | * | 5/1997 | Kitamura ..................... 73/105 |
| 5,805,448 | A | * | 9/1998 | Lindsay et al. .............. 700/71 |
| 5,939,719 | A | * | 8/1999 | Park et al. ................... 850/1 |
| 5,966,053 | A | * | 10/1999 | Durig et al. ............ 331/116 M |
| 5,986,381 | A | | 11/1999 | Hoen et al. |
| 6,530,266 | B1 | * | 3/2003 | Adderton et al. ............. 73/105 |
| 7,513,142 | B2 | | 4/2009 | Rice et al. |
| 7,836,757 | B2 | * | 11/2010 | Kitamura ..................... 73/105 |
| 8,166,567 | B2 | * | 4/2012 | Phan et al. .................... 850/1 |
| 2003/0137216 | A1 | * | 7/2003 | Tamayo de Miguel et al. ................. 310/311 |
| 2009/0062935 | A1 | | 3/2009 | Abramovitch et al. |
| 2009/0260113 | A1 | * | 10/2009 | Rice et al. ................... 850/33 |
| 2011/0041224 | A1 | * | 2/2011 | Raman .................. B82Y 35/00 850/40 |
| 2011/0061452 | A1 | * | 3/2011 | King ..................... G01Q 60/32 73/105 |

(Continued)

OTHER PUBLICATIONS

Surdilovic, A New Position Based Force/Impedance Control for Industrial Robots, Apr. 1996, Proceedings of the IEEE, pp. 630-634.*

(Continued)

*Primary Examiner* — Jason McCormack (57) ABSTRACT

A method for optimizing loop gain of an atomic force microscope (AFM) apparatus includes determining a change in gain of the physical system and adjusting a controller frequency response of the controller in an AFM loop to compensate for the determined change in gain. The AFM loop has a corresponding loop response that includes the product of the controller frequency response and a physical system response of the physical system.

19 Claims, 6 Drawing Sheets

(56) References Cited

U.S. PATENT DOCUMENTS

2011/0154546 A1* 6/2011 Proksch et al. .................. 850/1
2011/0167524 A1* 7/2011 Hu ....................... G01Q 10/065
                                                          850/1
2011/0271412 A1* 11/2011 Rychen .......................... 850/21

OTHER PUBLICATIONS

Sebastian, System Tools Applied to Micro-Cantilever based Devices, 2003, Multidiciplinary Research in Control, LNCIS 289, pp. 83-99.*
Surdilovic et al., A New Position Based Force/Impedance Control for Industrial Robots, Apr. 1996, Proceedings of the 1996 IEEE.*
Sebastian et al., System Tools Applied to Micro-Cantilever Based Devices, 2003, Multidiciplinary Research in Control, LNCIS 289, pp. 83-99.*
Co-pending U.S. Appl. No. 12/890,894, filed Sep. 27, 2010.
Co-pending Application No. PCT/US11/26191 filed Feb. 25, 2011.

* cited by examiner

AUTOMATIC GAIN TUNING IN ATOMIC FORCE MICROSCOPY

BACKGROUND

An atomic force microscope (AFM) is a comparatively high-resolution type of scanning probe microscope. With demonstrated resolution of fractions of a nanometer, AFMs promise resolution more than 1000 times greater than the optical diffraction limit.

Many known AFMs include a microscale cantilever with a sharp tip (probe) at its end that is used to scan the specimen surface. The cantilever is typically silicon or silicon nitride with a tip radius of curvature on the order of nanometers. When the tip is brought into contact with a sample surface, forces between the tip and the sample lead to a deflection of the cantilever. One or more of a variety of forces are measured via the deflection of the cantilevered probe tip. These include mechanical forces and electrostatic and magnetostatic forces, to name only a few.

Typically, the deflection of the cantilevered probe tip is measured using a laser spot reflected from the top of the cantilever and onto an optical detector. Other methods that are used include optical interferometry and piezoresistive AFM cantilever sensing.

One component of AFM instruments is the actuator that maintains the angular deflection of the tip that scans the surface of the sample in contact-mode. Most AFM instruments use three orthonormal axes to image the sample. The first two axes (e.g., X and Y axes) are driven to raster-scan the surface area of the sample with respect to the tip with typical ranges of 100 µm in each direction. The third axis (e.g., Z axis) drives the tip orthogonally to the plane defined by the X and Y axes for tracking the topography of the surface.

Generally, the actuator for Z axis motion of the tip to maintain a near-constant deflection in contact-mode requires a comparatively smaller range of motion (e.g., approximately 1 µm (or less) to approximately 10 µm). However, as the requirement of scan speeds of AFMs increases, the actuator for Z axis motion must respond comparatively quickly to variations in the surface topography. In a contact-mode AFM, for example, a feedback loop is provided to maintain the tip of a cantilever in contact with a surface. The tip-sample interaction is regulated by the Z feedback loop, and the bandwidth of the Z feedback loop dictates how fast scanning can occur with the Z feedback loop remaining stable.

In addition, AFMs have a number of tunable feedback loops, including the X, Y and Z feedback loops (although X and Y feedback loops are typically tuned at the factory, and not altered by the end user). Tuning the feedback loop is typically time consuming and difficult. For example, a user may manually tune the feedback loop by starting a scan with low gain, increasing some parameter until oscillation appears in the image, and then reducing the parameter until the oscillation subsides. However, the user must exercise great care because manual tuning of the feedback loop risks blunting the tip, e.g., as low gain enables the tip to crash into steps and excess gain induces positive feedback oscillations that cause the tip to repeatedly smash into the surface of the sample.

Further, the manual tuning must be repeated if anything in the AFM feedback loop is altered. For example, if the laser or the detector is realigned, then the total gain of the optical detection system will change, requiring additional tuning. Further, gradual shifts in laser power, temperature, piezoelectric constants, and the like may eventually detune or even destabilize the feedback loop. In practice, the user continually turns down the gains such that no alteration of the AFM can induce oscillations, and then takes images using very slow scan rates. In order to avoid the difficulties of manual tuning, techniques have been developed to automate tuning of the feedback loop. However, these techniques are generally complex, relatively slow, and may attempt one-time large increases in gain, which is risky in light of nonlinearities or measurement inaccuracies.

SUMMARY

In a representative embodiment, a method for optimizing loop gain of an atomic force microscope (AFM) apparatus includes determining a change in gain of the physical system and adjusting a controller frequency response of the controller in an AFM loop to compensate for the determined change in gain. The AFM loop has a corresponding loop response that includes the product of the controller frequency response and a physical system response of the physical system.

In another representative embodiment, a method for optimizing loop gain of an AFM loop in an AFM apparatus is provided, where the AFM apparatus includes a controller and a physical system. The method includes: (a) initializing a frequency of a signal input to the controller; (b) measuring a loop response of the AFM loop at the frequency; (c) determining whether a phase of the loop response is approximately the same as a target phase; (d) when the phase of the loop response is not approximately the same as the target phase, adjusting the frequency of the input signal and repeating steps (b) and (c), and when the phase of the loop response is approximately the same as the target phase, determining whether a magnitude of the loop response is approximately the same as a target magnitude; and (e) when the magnitude of the loop response is not approximately the same as the target magnitude, adjusting a gain of the controller and repeating steps (b), (c) and (d), and when the magnitude of the loop response is approximately the same as the target magnitude, setting the gain as the loop gain of the AFM loop.

In another representative embodiment, a computer readable medium is provided, having a computer readable program code embodied therein, the computer readable program code being adapted to be executed to implement a method for optimizing loop gain of an AFM loop in an AFM apparatus, the AFM apparatus including a controller and a physical system. The computer readable medium includes a measuring code segment, a phase determining code segment, and a magnitude determining code segment. The measuring code segment is for measuring a loop response of the AFM loop in response to a signal input to the controller, the input signal having a corresponding frequency. The phase determining code segment is for determining whether a phase of the loop response at the frequency is approximately the same as a target phase, and for adjusting the frequency when the phase of the loop response is not approximately the same as the target phase. The magnitude determining code segment is for determining whether a magnitude of the loop response at the frequency is approximately the same as a target magnitude, and for adjusting a gain of the controller when the magnitude of the loop response is not approximately the same as the target magnitude.

BRIEF DESCRIPTION OF THE DRAWINGS

The present teachings are best understood from the following detailed description when read with the accompany

DETAILED DESCRIPTION

In the following detailed description, for purposes of explanation and not limitation, representative embodiments disclosing specific details are set forth in order to provide a thorough understanding of the present teachings. Descriptions of known devices, materials and manufacturing methods may be omitted so as to avoid obscuring the description of the example embodiments. Nonetheless, such devices, materials and methods that are within the purview of one of ordinary skill in the art may be used in accordance with the representative embodiments.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

It is to be understood that certain terminology defined herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree.

As used in the specification and the appended claims and in addition to its ordinary meaning, the term "approximately" means to within an acceptable limit or amount to one having ordinary skill in the art.

As used herein, "physical system response" refers to a frequency response of a measured physical AFM signal when excited by a control loop output. For example, in a contact-mode AFM, the physical system response is the frequency response of the cantilever deflection signal to the controller output.

As used herein, "controller frequency response" refers to a designed frequency response of the controller that produces a voltage applied to an actuator, for example, in response to the deflection of the cantilever in a contact-mode AFM.

As used herein, "loop response" refers to the product of the physical system response and the controller frequency response.

Figure 1:
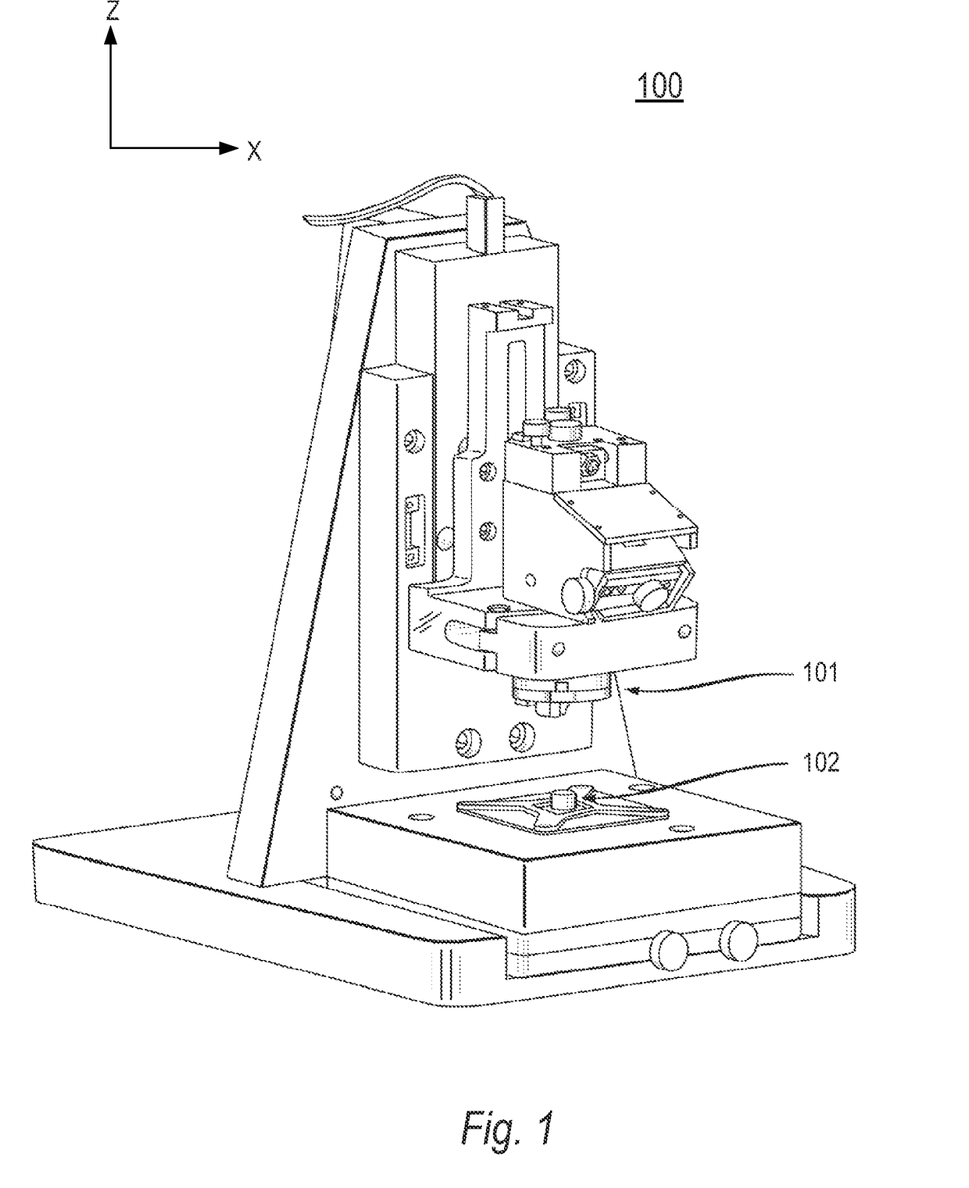
- FIG. 1 is a perspective view of an apparatus for atomic force microscopy (AFM) in accordance with a representative embodiment.

FIG. 1 is a perspective view of an apparatus 100 for atomic force microscopy (hereinafter "AFM 100") in accordance with a representative embodiment. As will be readily appreciated by one of ordinary skill in the art, the present teachings are applicable to various types of AFMs, which may also be referred to as scanning force microscopes (SFMs). The AFM 100 comprises many electrical and mechanical components, the discussion of which is outside the scope of the present teachings. The AFM 100 includes a probe assembly 101, certain components of which are described in connection with representative embodiments herein.

A sample 102 is maintained as shown for measurement and testing by the AFM 100. As described more fully herein, the sample 102 is generally moved in the X-Y plane of the coordinate system of FIG. 1 to raster-scan the surface of the sample by an actuator (not shown), with the surface topography being mapped by motion of the probe assembly 101 in the Z-direction.

Figure 2:
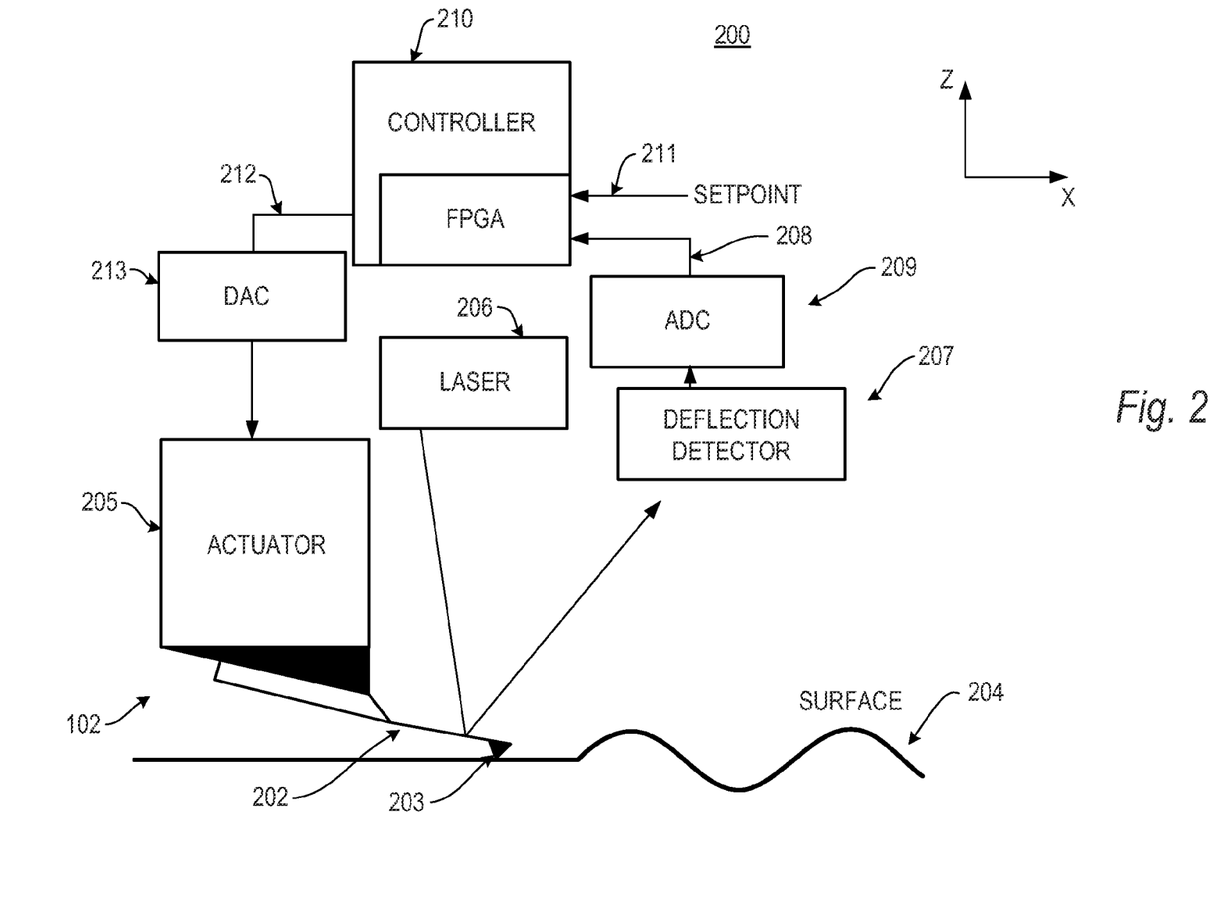
FIG. 2 is a simplified schematic block diagram of an AFM apparatus in accordance with a representative embodiment.

FIG. 2 is a simplified schematic block diagram of an AFM system 200 in accordance with a representative embodiment. The AFM system 200 comprises probe assembly 101, which comprises a cantilever 202 with a probe tip 203 connected thereto. The probe tip 203 contacts a surface 204 of a sample, and an actuator 205 is configured to raise and lower the probe tip 203 in response to contact movement with the surface 204. The probe tip 203 and cantilever 202 may be monolithically formed from a common substrate using known semiconductor processing techniques, and fastened to the actuator 205. Alternatively, the actuator 205, the cantilever 202 and the probe tip 203 may be monolithically formed from a common substrate. In representative embodiments, the probe tip 203 is configured to contact the surface 204 in order to make measurements of the surface topography. As such, AFM system 200 may be referred to as a contact-mode AFM.

The actuator 205 functions to provide motion of the probe tip 203 and cantilever 202 in the ±Z-direction of the coordinate system shown in order to maintain a substantially constant force between the probe tip 203 and surface 204 of the sample. In a representative embodiment, the actuator 205 may be an electrostatic "nanostepper" actuator, for example, such as described in commonly owned U.S. Pat. No. 5,986,381 to S. Hoen et al., dated Nov. 16, 1999, entitled "Electrostatic Actuator with Spatially Alternating Voltage Patterns," the disclosure of which is hereby incorporated by reference. Alternatively, the actuator 205 may be a piezoelectric actuator, for example, such as described in commonly owned U.S. patent application Ser. No. 12/890,894, filed on Sep. 27, 2010, entitled "Tandem Piezoelectric Actuator and Single Drive Circuit for Atomic Force Microscopy," to D. Schroeder, et al. (issued as U.S. Pat. No. 8,291,510 on Oct. 16, 2012), the disclosure of which is hereby incorporated by reference.

The AFM system 200 further comprises a laser 206 (or other suitable light source) disposed above the surface 204 of the sample. The laser 206 directs light which is reflected at the cantilever 202 and is incident on a deflection detector 207. The deflection detector 207 provides a deflection signal 208 to an analog-to-digital converter (ADC) 209, which provides a digitized signal to a controller 210. The deflection signal 208 is indicative of the movement of the probe tip 203 in the Z-direction of the coordinate system shown in FIG. 2. In response to the deflection signal 208, the controller 210 provides an output signal 212 to the actuator 205 via digital-to-analog converter (DAC) 213 to raise and lower the cantilever 202 and probe tip 203 to maintain a constant deflection equal to a setpoint deflection 211, leading to a constant force between the probe tip 203 and the surface 204 in contact-mode. Among other functions, the controller 210 may be configured to account for resonance conditions that can occur when the cantilever 202 is deflected off the surface 204 ("off-surface resonance conditions"), as described in commonly owned International Application PCT/US11/26191, filed on Feb. 25, 2011, entitled "Atomic Force Microscopy Controller and Method" to C. Moon, the disclosure of which is hereby incorporated by reference. In addition, the controller 210 may be configured to tune gain of the controller 210 automatically, as discussed more fully herein. Generally, the controller 210 and the physical system being controlled (e.g., actuator 205, the cantilever 202 and the probe tip 203) are referred to herein as a control loop.

The controller 210 may be implemented in whole or in part by a processing device, such as a processor or central processing unit (CPU), application specific integrated circuits (ASICs), field-programmable gate arrays (FPGAs), or combinations thereof, using software, firmware, hard-wired logic circuits, or combinations thereof. Details of certain aspects of the functions of the controller 210 are provided below in connection with the representative embodiments. In an embodiment, the controller 210 is implemented on a real-time operating system (OS) used in the AFM system 200 or as a standalone device. When using a processor or CPU, a memory (not shown) is included for storing executable software/firmware and/or executable code that controls the signal from the controller 210 to the actuator 205. The memory may be any number, type and combination of nonvolatile read only memory (ROM) and volatile random access memory (RAM), and may store various types of information, such as computer programs and software algorithms executable by the processor or CPU. The memory may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

For example, the controller 210 may include an FPGA onto which very high speed integrated circuit hardware description language (VHDL) code has been compiled and uploaded. The deflection signal 208 from the deflection detector 207 is digitized by ADC 209. Based on the deflection signal, the FPGA creates output signal 212 that emerges from the DAC 213, is amplified, and then provided to the actuator 205. The controller 210 illustratively includes a proportional-integral-differential (PID) filter block and a series of digital biquadratic filters, known to one of ordinary skill in the art. The PID filters and the digital biquadratic filters of the controller 210 have coefficients useful in establishing the filter characteristics. The coefficients can be dynamically reconfigured to change the filter characteristics, such as by a remote computer (e.g. a computer hosting a graphical user interface for the AFM system 200 and communicating via a communication protocol, such as ethernet). The frequency response of the controller 210 is a function of the filter coefficients, and methods for calculating theoretical frequency responses for digital filters are well-known. Illustratively, the frequency responses of the controller 210 can be calculated using known programming software (e.g., MatLab). For example, a notch filter for use in mitigating off-surface resonances of the cantilever 202, as described by International Application PCT/US11/26191 to C. Moon, can be specified by a center frequency, a depth, and a width (quality (Q) or damping factor). Known programming software tools (e.g., Matlab) or analytical expressions can be used to convert the desired parameters of the notch filter into biquadratic filter coefficients for the biquadratic filters of the controller 210.

Figure 3:
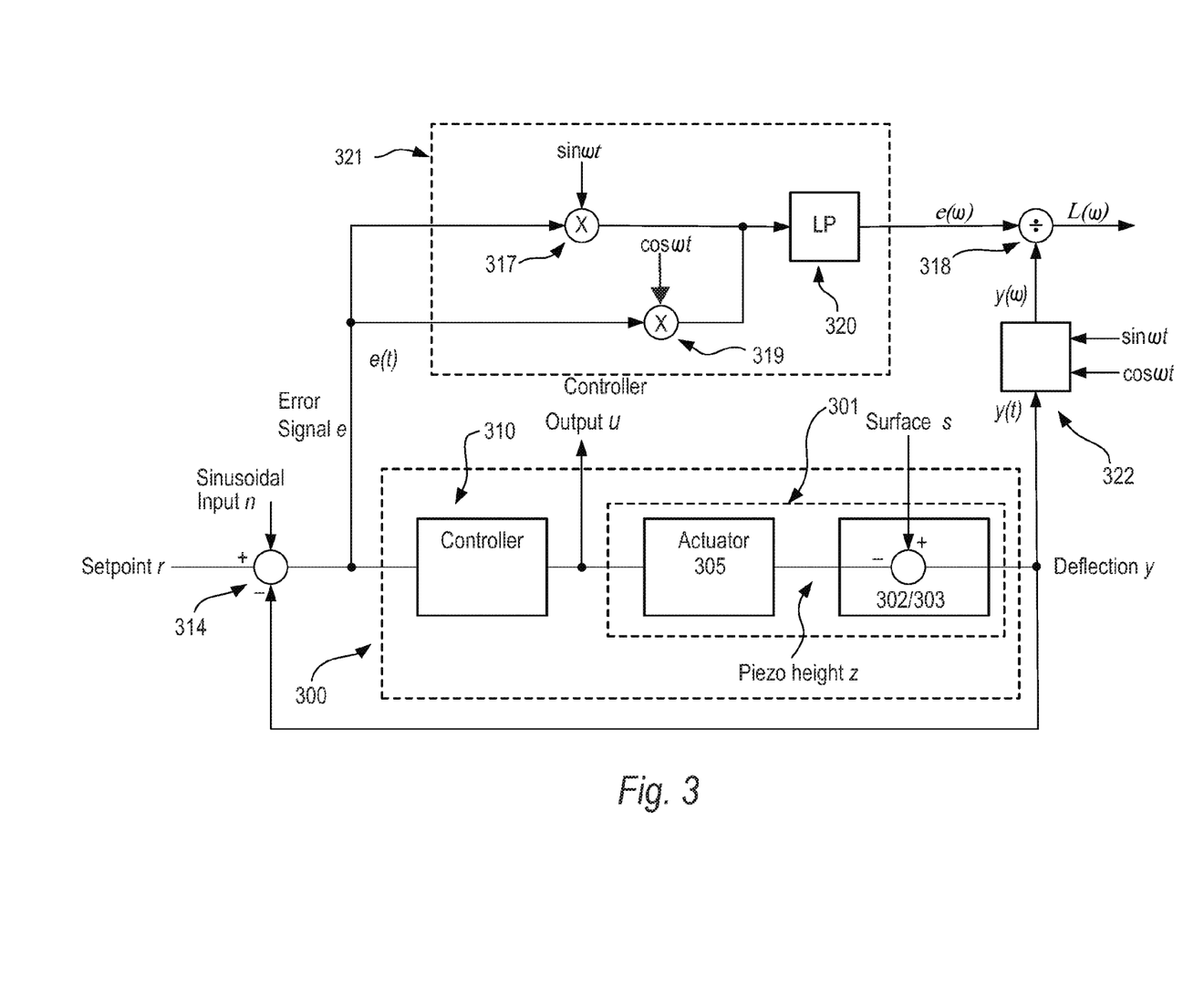
FIG. 3 is a simplified schematic block diagram of a feedback loop of a controller in an AFM apparatus in accordance with a representative embodiment.

FIG. 3 is a simplified schematic block diagram of a control loop (or feedback loop) of a controller in an AFM apparatus in accordance with a representative embodiment. The AFM loop 300 includes controller 310 and physical system 301, where the physical system 301 includes actuator 305 cantilever 302 and probe tip 303, which are substantially the same as the controller 210, the actuator 205, the cantilever 202 and the probe tip 203, discussed above with reference to FIG. 2, for example.

As stated above, the loop response (L) is the product of the controller frequency response (C) of the controller 310 and the physical system response (P) of the physical system 301, or L=CP. According to various embodiments, the overall gain of the controller 310 may be re-optimized after the physical system 301 has been resealed and/or other components of the AFM apparatus have been tuned. For example, the various embodiments may be used to optimize gains of one or more controllers in the AFM apparatus, such as X, Y and Z positioning loops.

Generally, the controller 310 adjusts the voltage on the actuator 305 in response to the changing height of a sample beneath the probe tip 303, maintaining the deflection y at setpoint r in contact-mode, where the deflection y is the deflection of the cantilever 302 in the physical system 301. To measure the loop response L of the AFM loop 300, the system is excited at a single frequency $\omega_0$ by adding sinusoidal input n to the normal value of an input signal, where n=a sin $\omega$t. Error signal e is calculated in the time domain as e(t)=r(t)−y(t)+n(t), where n(t)=a sin $\omega_0$t is the injected sinusoidal input. Then, first mixer 321 multiplies the time-domain error signal e(t) by sin $\omega_0$t and cos $\omega_0$t via multipliers 317 and 319, respectively, and integrates each product over some number of periods of the oscillation, or otherwise filters the product via low-pass filter 320, for example, to yield the real and imaginary parts of the frequency-domain error signal e($\omega_0$).

The error signal e(t) is also input to the controller 310, which provides controller output u to the physical system 301 in accordance with the controller frequency response C. Inside the physical system 301, the voltage to the actuator 305 results in a change of the piezo height z, which alters the height of the probe with respect to the height s of the surface along the Z axis. As indicated in FIG. 3, the deflection y of the cantilever 302 is provided as the difference between the surface height s of the sample and the piezo height z of the actuator 305. Then, second mixer 322 multiplies the time-domain deflection y(t) by sin $\omega_0$t and cos $\omega_0$t via multipliers (not shown), similar to the first mixer 321, discussed above, to yield the real and imaginary parts of the frequency-domain deflection $y(\omega_0)$. Thus, at the same time the error signal $e(\omega_0)$ is calculated, the frequency-domain deflection $y(\omega_0)$ is calculated by second mixer 322 using the time-domain deflection signal $y(t)$ (e.g., provided by deflection detector 207 shown in FIG. 2).

When not scanning, the input surface height s is constant, and the loop response L at the frequency $\omega_0$ is the mixed deflection $y(\omega_0)$ divided by the mixed error signal $e(\omega_0)$ at divider 318, thus $L(\omega_0)=y(\omega_0)/e(\omega_0)$. More particularly, since the AFM loop 300 is a closed feedback loop, the sinusoidal input n may be added in any place of the AFM loop 300, and measured to determine how it changes as it propagates around the AFM loop 300. The response in all signals may be measured simultaneously, with multiple mixers (e.g., first and second mixers 321 and 322) operating in parallel. An example of exciting a system at a frequency $\omega_0$ is described in U.S. Patent App. Pub. No. 2009/0062935 to D. Abramovitch et al., dated Mar. 5, 2009, entitled "Automatic Generation of PID Parameters for an Atomic Force Microscope" (issued as U.S. Pat. No. 7,987,006 on Jul. 26, 2011), the disclosure of which is hereby incorporated by reference.

Of course, any of alternative techniques for measuring the loop response L may be incorporated without departing from the scope of the present teachings. For example, the physical system response (deflection y/controller output u) and the controller frequency response (controller output u/error signal e) may be independently measured, and then multiplied together to determine the loop response L. This same technique may be applied by calculating (as opposed to measuring) the controller frequency response, based on known controller design and the measured physical system response. Also, the sinusoidal input n may be injected into a different signal, or two different signals for two separate measurements. In another example, a closed-loop transfer function T may be measured, where $T=L/(1+L)$. The loop response L may then be determined by inverting the closed-loop transfer function T, or $L=T/(1-T)$. The closed-loop transfer function T may be determined as the ratio of the deflection y and the setpoint r. The closed-loop transfer function T may also be determined by injecting the sinusoidal signal n into the setpoint r, or by dividing the "raw" error e0 by the sinusoidal signal n, or $T=e0/n$, where e0 is the difference between the deflection y and the setpoint r before the sinusoidal signal n is added. Alternatively, sensitivity function S may be directly measured, where $S=1/(1+L)$. The loop response L may then be determined by inverting the sensitivity function S, or $L=(1-S)/S$. The sensitivity function S may be determined by dividing the error signal e by the setpoint r, or by dividing the error signal e by the sinusoidal signal n.

Optimizing or shaping the loop response L requires the frequency response of the AFM apparatus to be measured at all frequencies, and tuning the controller response C accordingly. However, variations in the AFM apparatus may result in changes in gain to the controller 310 and/or the physical system 301, which require re-optimizing the overall gain of the controller 310. For example, if the physical system 301 is rescaled, the gain of the controller 310 must be adjusted to keep the loop response L constant.

Loop shaping typically involves selecting a controller frequency response C that best makes the loop response L have a desired loop response $L_0$, such that the controller frequency response C is the product of the desired loop response $L_0$ and the inverse of the physical system response P, or $C \approx L_0 P^{-1}$. Once the loop has been shaped, resonances and other dynamics in the physical response P may be compensated for and therefore do not appear in the loop response L.

In practice, the dynamics of the physical system 301 stay fairly constant, but the overall gain typically changes, for example, due to variations in the piezo constant, laser power, or electrical circuit gains. Therefore, the physical system response P effectively becomes kP, where k is a real number representing the overall gain. When the gain changes, it would require significant effort to re-measure the physical system response P at all frequencies and to re-design the corresponding controller frequency response C. However, according to various embodiments, these time consuming efforts are avoided, in that the controller frequency response C is adjusted by dividing the controller frequency response C by the gain k, or C/k, to compensate for the change in overall gain, as described with reference to FIG. 4, below.

Figure 4:
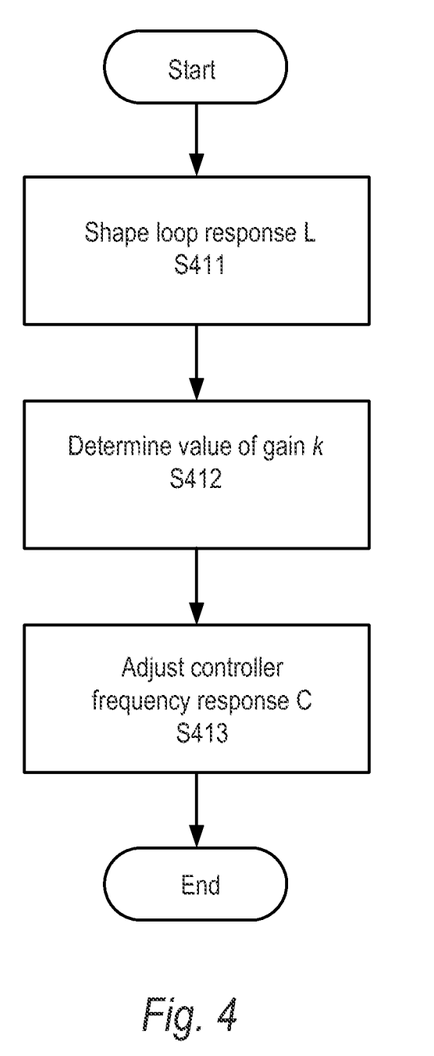
FIG. 4 is a flow diagram showing automatic gain control in accordance with a representative embodiment.

FIG. 4 is a flow diagram showing automatic gain control in accordance with a representative embodiment. In block 5411, optional loop shaping of the loop response L is performed. For example, the loop shaping may include selecting a controller frequency response C of controller 310 that results in the desired loop response $L_0$. Shaping the loop response L compensates for resonances of the physical system response P.

Subsequently, the overall gain of the controller 310 changes, for example, due to changes in gain of one or more components of the physical system 301. Therefore, a value of the gain k is determined in block 5412, and the initial controller frequency response C is adjusted by dividing the controller frequency response C by the gain k to compensate at block S413. For example, the value of the gain k may be determined by measuring the physical system response P of the physical system 301 at some frequency $\omega_0$ at a first time, and then again measuring the physical system response P of the physical system 301 at the same frequency $\omega_0$ at a second time. The ratio of the two physical system response P measurements provides the gain k. Rather than fully compensating for the measured gain k all at once, the compensation may be performed iteratively. This approach accounts for nonlinearities which may cause the measured gain k to depend on controller gain, for example.

Various embodiments enable compensating for drifts in the dynamics of the physical system response P. Also, since the desired loop response $L_0$ may be chosen to satisfy some stability criterion, such as a certain phase margin, various embodiments ensure that the stability criterion is satisfied. For example, gain may be determined per a single frequency, e.g., the frequency where the phase meets the desired phase margin, but the frequency may have varied from when the controller 310 was last tuned. Therefore, in various embodiments, the automatic gain control process first locates the frequency and then adjusts the overall gain until the stability criterion is satisfied.

Stated somewhat differently, after tuning the controller 310, bandwidth becomes limited only by a single frequency, which may be referred to as the critical frequency ($\omega_c$), where accrued phase becomes excessive. The critical frequency is located and adaptively tracked, while the gain is automatically brought to its optimal value, as discussed below with reference to FIG. 5. For example, for purposes of explanation, it may be assumed that the AFM loop 300 in contact mode has been shaped as a simple integrator, $|L(\omega)|=k/\omega$, where $|L|$ is the magnitude of the loop response, k is the overall gain and $\omega$ is angular frequency of the sinusoidal input signal n, as shown in FIG. 3. The optimal gain may be defined per phase margin $\phi_{pm}$, which is 180 degrees plus the phase of the loop response L at the lowest frequency where the magnitude of the loop response is unity, or |L|=1. For example, in various implementations, the phase margin $\phi_{pm}$ may be 60 degrees. The goal is to identify the critical frequency $\omega_c$ at which the phase of the loop response L is 180 degrees from the phase margin $\phi_{pm}$, or in the present example, $\angle L(\omega) = -180° + \phi_{pm}$, and then to track the critical frequency $\omega_c$ while the gain is increased to where the magnitude of the loop response is unity, or $|L(\omega_c)|=1$. Although described in terms of the contact mode, it is understood that the various embodiments may apply to any other AFM mode, such as AC mode or frequency modulation (FM) mode, as well as to any type of feedback loop included in these modes, without departing from the scope of the present teachings.

Figure 5:
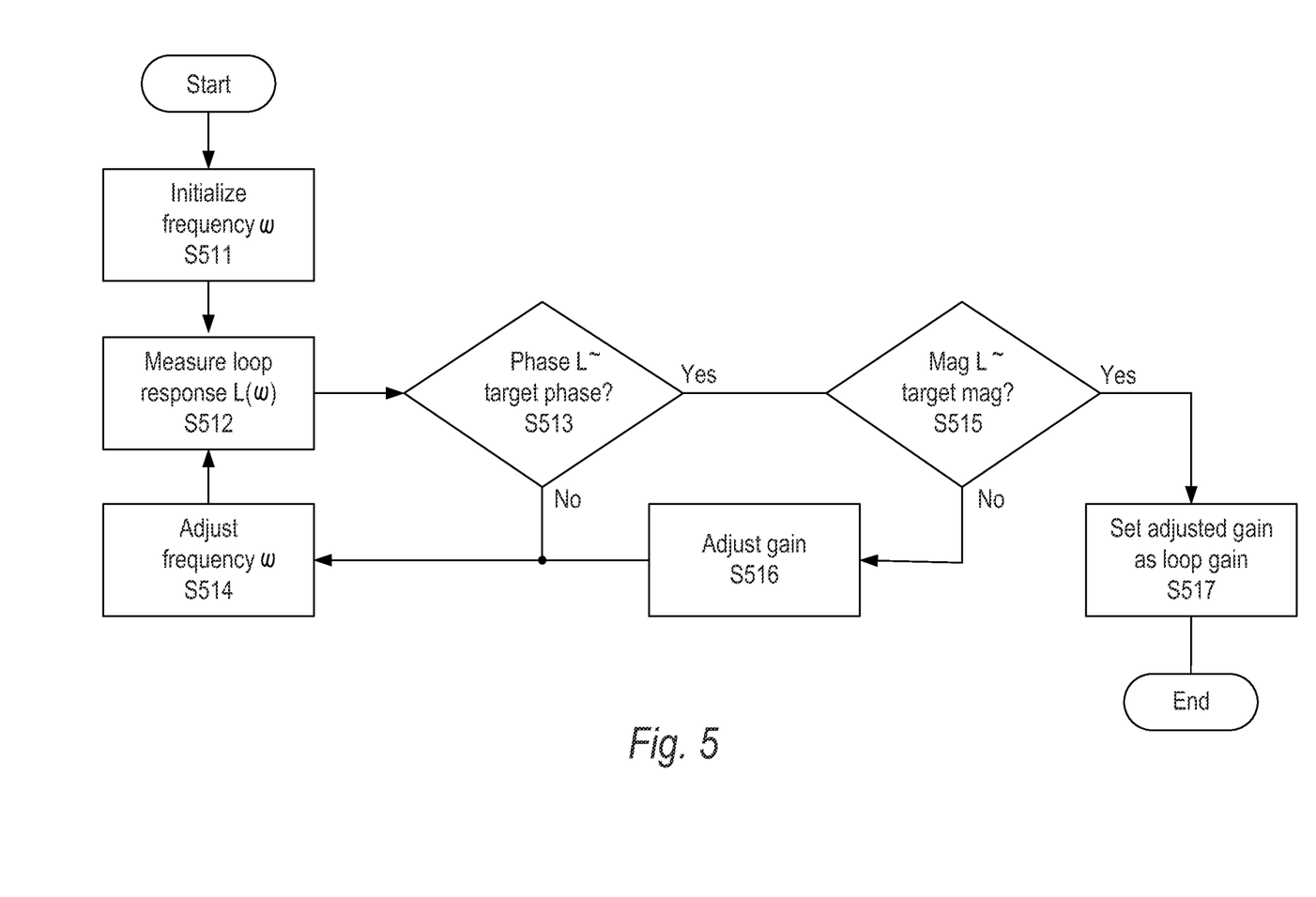
FIG. 5 is a flow diagram showing automatic gain control in accordance with a representative embodiment.

FIG. 5 is a flow diagram showing automatic gain control in accordance with a representative embodiment, which may be implemented, for example, by controller 210, 310 in FIGS. 2 and 3. The automatic gain control process may be carried out through implementation of the hardware, software and firmware described above.

In block S511, the frequency $\omega$ of the sinusoidal input signal n is initialized. For example, the frequency $\omega$ may be set to a previously determined frequency or some low frequency (e.g., in a range of about 1 kHz to about 10 kHz). The sinusoidal input signal n is input to the AFM loop 300 and the corresponding loop response L for the frequency $\omega$ is measured in block S512. For example, the loop response L may be determined by the product of the controller frequency response C and the physical system response P, or simply by the ratio of the deflection y and the error signal e, as discussed above.

In block S513, the phase of the measured loop response L is compared to a target phase, to determine whether the phase of the measured loop response L is approximately equal to the target phase. For example, the target phase may be −120 degrees, which is 180 degrees from the illustrative phase margin $\phi_{pm}$ of 60 degrees. In an embodiment, the phase only needs to be approximately equal to the target phase, for example, within about one degree of −120 degrees, or in a range of about −119 degrees to about −121 degrees, although other ranges may be implemented without departing from the scope of the present teachings. When the phase of the measured loop response L is not approximately equal to the target phase (block S513: No), the frequency $\omega$ is adjusted in block S514. For example, the frequency $\omega$ may be adjusted to a higher (or lower) frequency by a predetermined incremental amount (e.g., about 100 Hz to about 1 kHz). In an embodiment, the incremental amount may vary, being proportional to the difference between the phase of the measured loop response L and the target phase. For example, as discussed below with reference to FIGS. 6A and 6B, the incremental amounts of increases in the frequency $\omega$ become smaller as the measured loop response L approaches the target phase.

The sinusoidal input signal n with the adjusted frequency $\omega$ is then applied to the AFM loop 300, and the corresponding loop response L is again measured in block S512. In block S513, the phase of the measured loop response L is again compared to the target phase, to determine whether the phase of the measured loop response L is approximately equal to the target phase. When the phase of the measured loop response L is not approximately equal to the target phase (block S513: No), the cycle is repeated through blocks S514 and S512.

Eventually, after one or more adjustments to the frequency $\omega$ in block S514, it is determined that the phase of the measured loop response L is approximately equal to the target phase (block S513: Yes). When this occurs, the magnitude of the measured loop response L is compared to a target magnitude to determine whether the magnitude of the measured loop response L is approximately equal to the target magnitude at block S515. For example, the target magnitude may be zero dB (or unity gain). In an embodiment, the magnitude only needs to be approximately equal to the target magnitude, for example, within plus or minus five percent, or in a range of about 1.05 to about 0.95, although other ranges may be implemented without departing from the scope of the present teachings. When the magnitude of the measured loop response L is not approximately equal to the target magnitude (block S515: No), the gain of the controller 310 is adjusted in block S516. For example, the gain may be adjusted higher (or lower) by a predetermined incremental amount (e.g., about 1 dB to about 5 dB). In an embodiment, the incremental amount may vary, being proportional to the difference between the magnitude of the measured loop response L and the desired magnitude. Likewise, the frequency $\omega$ of the sinusoidal input signal n may be adjusted again in block S514, by small amounts, in order to continue to lock onto the target phase.

The process returns to block S512 for measuring the loop response at the L at the adjusted gain and frequency $\omega$. It is then determined in block S513 whether the phase of the measured loop response L is still approximately equal to the target phase (block S513: Yes). At this stage, the immediately preceding adjustment to the frequency $\omega$ is typically very small, so it is likely that the measured loop response L will still be approximately equal to the target phase. The magnitude of the measured loop response L is again compared to the target magnitude in block S515 to determine whether the magnitude of the measured loop response L is approximately equal to the target magnitude. When the magnitude of the measured loop response L is not approximately equal to the target magnitude (block S515: No), the cycle is repeated through blocks S516, S514, S512 and S513.

Eventually, after one or more adjustments to the gain in block S516 (as well as corresponding minor adjustments to the frequency $\omega$ in block S514), it is determined that the magnitude of the measured loop response L is approximately equal to the target magnitude (block S515: Yes). When this occurs, the adjusted gain is set as the gain of the controller 210 and thus the loop gain of the AFM loop 300 in block S517, which has been appropriately and automatically tuned, and the process ends.

Notably, for purposes of illustration, FIG. 5 depicts the phase of the measured loop response L being compared to and reaching the target phase in a first loop before the magnitude of the measured loop response L is compared to and reaches the target magnitude in a second loop. However, it is understood that it is not necessary to wait for the phase to reach the target phase in the first loop before beginning execution of the second loop. Rather, in various implementations, the first and second loops may be performed independently of one another, or may otherwise overlap.

In various implementations, the process may include a predetermined frequency, rather than a target phase. For example, it may be a given that the input sinusoidal signal n is a 10 kHz signal. Accordingly, the gain is determined and adjusted to unity without first identifying a frequency corresponding to a target phase. Also, the process may be used to adjust gain to values other than unity. For example, the frequency may be incrementally adjusted to find one or more peaks. Then, the gain may be adjusted to a predetermined limit (e.g., −3 dB) at the peak frequencies.

Figure 6A:
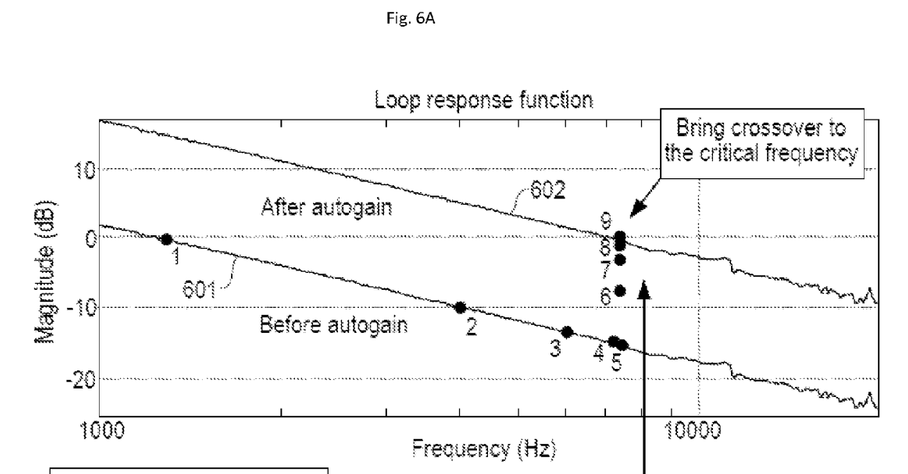
FIG. 6A depicts magnitude of a loop response before and after automatically tuning gain in accordance with a representative embodiment.
Figure 6B:
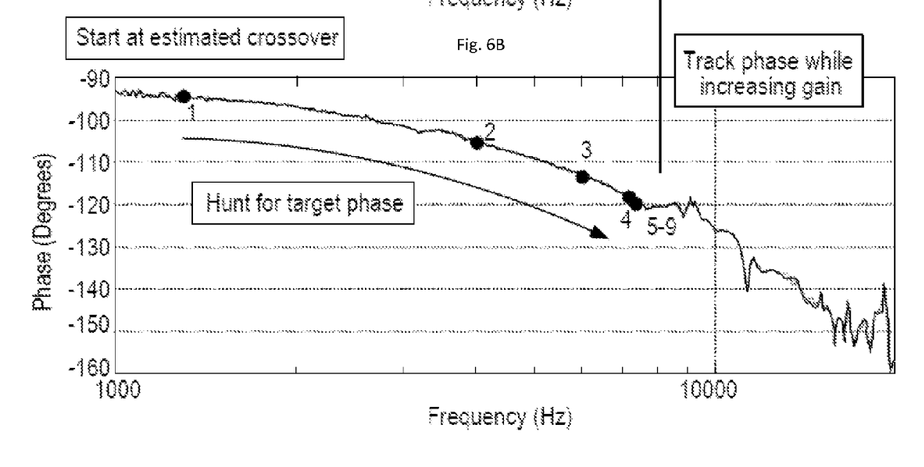
FIG. 6B depicts phase of a loop response before and after automatically tuning gain in accordance with a representative embodiment.

FIGS. 6A and 6B respectively depict magnitude and phase of a loop response to the sinusoidal input signal n before and after automatically tuning gain in accordance with a representative embodiment, where trace 601 shows the loop response before the automatic gain tuning and trace 602 shows the loop response after the automatic gain tuning. More particularly, in the depicted example, nine measurements were made of the loop response L (indicated as points 1-9), e.g., of the AFM loop 300. Generally, points 1-5 indicate where the process hunted for the frequency ω at which the phase margin was met (the frequency $\omega_c$), and points 6-9 indicate where the process increased overall gain while making slight changes to the frequency ω, continuing to lock onto the target phase. As discussed above, the target phase of the loop response L is assumed to be −120 degrees and the target magnitude of the loop response L is assumed to be 1 (zero dB).

Referring to FIGS. 6A and 6B, point 1 indicates an initial frequency ω of the sinusoidal input signal n of about 1.5 kHz, which may be determined as the estimated crossover point of the loop response. The initial frequency ω results in a magnitude of about zero (unity gain) and a phase of about −95 degrees of the loop response L. Point 2 indicates an adjusted frequency ω of the response signal of about 4 kHz, which results in a magnitude of about −10 dB and a phase of about −106 degrees of the loop response L. Notably, because the phase of the initial frequency ω was relatively far from the target phase of −120 degrees, the increase in the frequency ω was relatively large (i.e., plus 3 kHz) in order to approach the target phase more quickly in the early stages of the process. The adjustments in frequency and the size of the increases may be made by operation of the controller (e.g., controller 210, 310).

Point 3 indicates an adjusted frequency ω of about 6 kHz, which results in a magnitude of about −12 dB and a phase of about −114 degrees of the loop response L. Point 4 indicates an adjusted frequency ω of about 7 kHz, which results in a magnitude of about −15 dB and a phase of about −118 degrees of the loop response L. Point 5 indicates an adjusted frequency ω of about 7.5 kHz, which results in a magnitude of about −13 dB and a phase of about −120 degrees (i.e., the target phase) of the loop response L. Thus, point 5 indicates the critical frequency $\omega_c$ of the loop response L, at which the phase is about −120 degrees. As shown, the incremental increases in the frequency ω between points 2-3, points 3-4 and points 4-5 become smaller as the phase approaches the target phase, which results in finding the critical frequency $\omega_c$ more efficiently. Of course, incremental increases may be at equal intervals, for example, without departing from the scope of the present teachings.

As the frequency increases, the corresponding gain decreases, such that at the target phase (point 5), the magnitude of the response signal is about −15 dB. Therefore, once the target phase is reached, the gain is incrementally increased until it is about equal to one, or substantially the same as the original gain. In other words, the crossover point is brought to the critical frequency $\omega_c$. The gain may be increased by operation of the controller (e.g., controller 210, 310). In the depicted example, point 6 indicates an increase in magnitude of the loop response L to about −8 dB, point 7 indicates an increase in magnitude to about −3 dB, point 8 indicates an increase in magnitude to about −1 dB, and point 9 indicates an increase in magnitude to about 0 dB. For each of points 6-9, fairly minor adjustments are made to frequency ω, while the phase of the loop response L remains substantially unchanged. As a result, point 9 indicates the critical frequency $\omega_c$ of the loop response L, at which the phase is about −120 degrees and the magnitude is about 0 dB.

According to various embodiments, a sample surface may be engaged under more controlled conditions. For example, gain may be reduced to moderate levels, so that the probe tip (e.g., probe tip 203, 303) touches down on the sample surface with little chance of ringing. The gain may then be optimized, for example, through embodiments of the automatic gain tuning process disclosed herein. In addition, the various embodiments provide the controller (e.g., controller 210, 310) with additional capability, such as customizing gains of various components (e.g., ADC 209 and DAC 213), varying power of the laser (e.g., laser 206), adding low-pass filtering, and the like, to suit different experimental conditions, without having to re-tune and/or to re-optimize the loop response.

Also, due to nonlinearity of the actuator (e.g., actuator 205, 305), the X-Y translation stage moves a slightly greater distance per volt for greater excursions than Z translation stages. Thus, conventional gain tuning performed on signals having large sine amplitudes will be non-optimal for signals having smaller amplitudes. However, using embodiments of the automatic gain tuning process disclosed herein, the loop response may be optimized to suit any desired scan size.

In the above described embodiments, the automatic gain tuning process may be used to maximize feedback bandwidth. However, in various implementations, the automatic gain tuning process may be used to reduce the feedback bandwidth to a desired value. For example, decreasing the feedback bandwidth rejects sensor noise, which may be useful if all disturbances and setpoints are low-frequency. For example, 1 Hz scans do not require 1 kHz of x bandwidth. Therefore, the gain may be adjusted in order to achieve, e.g., an x crossover frequency of 20 Hz.

Notably, the various embodiments are not limited to AFM implementations. Automatically controlling gain may be used in any system that is limited by phase and not by gain associated with resonances.

In view of this disclosure it is noted that the various apparatuses and methods for controlling an AFM can be implemented in variant structures, using variant components and variant methods in keeping with the present teachings. Further, the various components, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A method for optimizing loop gain of an atomic force microscope (AFM) apparatus comprising a controller and a physical system, the physical system comprising an actuator, a cantilever and a probe tip, the method comprising:
   determining a change in gain of the physical system as the AFM apparatus operates in a contact-mode in which a substantially constant force is maintained between the probe tip and a surface of a sample;
   adjusting a controller frequency response of the controller in an AFM loop to compensate for the determined change in gain, the AFM loop having a corresponding loop response comprising the product of the controller frequency response and a physical system response of the physical system; and optimizing and reoptimizing an overall gain of the controller after the physical system has been rescaled and/or the controller has been tuned.

2. The method of claim 1, wherein adjusting the controller frequency response comprises:

dividing an initial controller frequency response by the determined change in the gain.

3. The method of claim 2, wherein determining the change in the gain comprises:

measuring the physical system response at a predetermined frequency at a first time;

measuring the physical system response at the predetermined frequency at a subsequent second time; and determining the ratio of the physical system response measured at the first time and the physical system response measured at the second time.

4. The method of claim 1, further comprising:

initially shaping the loop response of the AFM loop, wherein shaping the loop response comprises selecting an initial controller frequency response to cause the loop response to have a desired shape.

5. The method of claim 4, wherein shaping the loop response compensates for resonances of the physical system response.

6. The method of claim 1, wherein adjusting the controller frequency response to compensate for a subsequent change is performed iteratively.

7. A method for optimizing loop gain of an atomic force microscope (AFM) loop in an AFM apparatus, the AFM apparatus including a controller and a physical system, the method comprising:

(a) initializing a frequency of a signal input to the controller;

(b) measuring a loop response of the AFM loop at the frequency;

(c) determining whether a phase of the loop response is approximately the same as a target phase;

(d) when the phase of the loop response is not approximately the same as the target phase, adjusting the frequency of the input signal and repeating steps (b) and (c), and when the phase of the loop response is approximately the same as the target phase, determining whether a magnitude of the loop response is approximately the same as a target magnitude;

(e) when the magnitude of the loop response is not approximately the same as the target magnitude, adjusting a gain of the controller and repeating steps (b), (c) and (d), and when the magnitude of the loop response is approximately the same as the target magnitude, setting the gain as the loop gain of the AFM loop; and (f) optimizing and reoptimizing an overall gain of the controller after the physical system has been resealed and/or the controller has been tuned.

8. The method of claim 7, wherein measuring the loop response comprises determining the product of a controller frequency response of the controller and a physical system response of the physical system.

9. The method of claim 7, wherein measuring the loop response comprises determining the ratio of a deflection response of deflection of a cantilever in the physical system at a frequency and an error response of an error signal indicating a difference between the deflection of the cantilever and a predetermined setpoint.

10. The method of claim 7, wherein measuring the loop response comprises:

determining a closed-loop transfer function as the ratio of a deflection of a cantilever in the physical system and a setpoint; and inverting the closed-loop transfer function.

11. The method of claim 7, wherein measuring the loop response comprises:

determining a sensitivity function as the ratio of an error signal and a setpoint, the error signal indicating a difference between a deflection of a cantilever of the physical system and the setpoint; and inverting the sensitivity function.

12. The method of claim 7, wherein the target phase is 180 degrees from a predetermined phase margin.

13. The method of claim 12, wherein the predetermined phase margin comprises a phase of the loop response where the magnitude of the loop response is unity at a lowest frequency.

14. The method of claim 7, wherein the target magnitude is unity gain.

15. The method of claim 7, wherein adjusting the frequency comprises increasing the frequency by a predetermined incremental amount.

16. The method of claim 15, wherein the predetermined incremental amount decreases as the phase of the loop response approaches the target phase.

17. A non-transitory computer readable medium having a computer readable program code embodied therein, the computer readable program code adapted to be executed to implement a method for optimizing loop gain of an atomic force microscope (AFM) loop in an AFM apparatus, the AFM apparatus including a controller and a physical system, the computer readable medium comprising:

a measuring code segment for measuring a loop response of the AFM loop in response to a signal input to the controller, the input signal having a corresponding frequency;

a phase determining code segment for determining whether a phase of the loop response at the frequency is approximately the same as a target phase, and for adjusting the frequency when the phase of the loop response is not approximately the same as the target phase;

a magnitude determining code segment for determining whether a magnitude of the loop response at the frequency is approximately the same as a target magnitude, and for adjusting a gain of the controller when the magnitude of the loop response is not approximately the same as the target magnitude; and an optimizing and a reoptimizing code segment for adjusting an overall gain of the controller after the physical system has been resealed and/or the controller has been tuned.

18. The non-transitory computer readable medium of claim 17, wherein the magnitude determining code segment determines whether the magnitude of the loop response at the frequency is approximately the same as the target magnitude and adjusts the gain of the controller after the phase determining code segment determines that the phase of the loop response at the frequency is approximately the same as the target phase.

19. The non-transitory computer readable medium of claim 17, wherein the target magnitude is selected such that the gain is unity at a crossover point of a loop response signal at a frequency corresponding to the target phase.

* * * * *